US008297150B2

(12) United States Patent  
Dismon et al.

(10) Patent No.: US 8,297,150 B2  
(45) Date of Patent: Oct. 30, 2012

(54) GEARBOX

(75) Inventors: Heinrich Dismon, Gangelt (DE); Andreas Koester, Essen (DE)

(73) Assignee: Pierburg GmbH, Neuss (DE)

( * ) Notice: Subject to any disclaimer, the term of this patent is extended or adjusted under 35 U.S.C. 154(b) by 2461 days.

(21) Appl. No.: 11/089,106

(22) Filed: Mar. 24, 2005

(65) Prior Publication Data

US 2005/0217418 A1 Oct. 6, 2005

(30) Foreign Application Priority Data

Apr. 1, 2004 (DE) .......................... 10 2004 015 988

(51) Int. Cl.
*F16H 57/02* (2006.01)

(52) U.S. Cl. ...................................... 74/606 R

(58) Field of Classification Search ............... 74/606 R; 439/34, 278, 874; 310/75 R, 83, 99, 40 MM
See application file for complete search history.

(56) References Cited

U.S. PATENT DOCUMENTS

| 5,446,326 | A  | * | 8/1995  | Scheider | 310/83 |
| 5,845,544 | A  | * | 12/1998 | Huggins et al. | 74/606 R |
| 6,626,143 | B1 | * | 9/2003  | Wayama et al. | 123/399 |
| 6,756,711 | B2 | * | 6/2004  | Matsuyama et al. | 310/68 R |
| 7,073,410 | B2 | * | 7/2006  | Albert | 74/606 R |
| 2003/0102767 | A1 |  | 6/2003  | Adachi | 310/239 |

FOREIGN PATENT DOCUMENTS

| DE | 197 02 685 | 7/1998 |
| DE | 101 22 053 | 12/2001 |
| EP | 1 327 798 | 7/2003 |
| JP | 2002-291192 | 10/2002 |

OTHER PUBLICATIONS

European Search Report for EP 05 00 5103 dated Jan. 23, 2008.

* cited by examiner

*Primary Examiner* — Vicky Johnson  
(74) *Attorney, Agent, or Firm* — Ballard Spahr LLP

(57) ABSTRACT

A gearbox for a gear (14) to be connected to an electric motor (36) comprises a box body (10) and a box cover (12). Arranged internally of the box cover (12) is a holding portion for an output shaft bearing (24). According to the invention, electric connectors (46) for electric connection of the electric motor (36) are provided within the box body (10), and the electric feed lines (48) connected to the electric connectors (46) are injection-molded into the box body (10).

6 Claims, 3 Drawing Sheets

GEARBOX

CROSS REFERENCE TO RELATED APPLICATIONS

This application claims priority to German Application No. 10 2004 015 988.2, filed Apr. 1, 2004. The aforementioned application is incorporated herein by reference.

BACKGROUND OF THE INVENTION

The present invention relates to a gearbox for a gear to be connected to an electric motor. The electric motor can be particularly a universal actuator which may additionally be provided with sensorics.

In motor vehicles, electric motors are put to use as actuators together with a gear which is provided e.g. as a planetary gear. In such an arrangement, an actuator with gear of the above type is used for the actuating of valves, throttle flaps, and the like. Thus, this kind of actuator is best suited for highly precise drives. An actuator of the above type is described, for instance, in DE 102 01 140.

Known actuators which are useful for throttle valves etc. in motor vehicles suffer from the disadvantage of requiring considerable constructional space. Since various automobile manufacturers use different electric plug contacts while, on the other hand, the actuators are bought-in parts, it is frequently necessary to provide adapter plugs or to use specially customized components, resulting in an increase of costs.

It is an object of the invention to provide a gearbox for a gear connectible to an electric motor which will require less constructional space and can be adapted in a simple manner to various plug contact systems.

SUMMARY OF THE INVENTION

The gearbox according to the instant invention comprises an e.g. cup-shaped box body closed by a box cover. The box lid is provided with a bearing holding portion for the bearing of an output shaft so that the output shaft which is connectible to the gear mounted in the box can be arranged in the box cover. According to the invention, to make optimum use of the constructional space and to simplify the assembly process, the box body is equipped with electric connectors for connection of an electric motor. Preferably, these connectors are provided as elastically formed contact elements which are adapted, during the mounting of the electric motor, to receive e.g. contact pins arranged on the electric motor. This has the advantage that the electric contact will be established during the assembly of the electric motor. According to the invention, the electric feed lines connected to electric connectors are arranged within the walls of the box body. In case of a box body preferably made of plastic, the feed lines have the walls of the box body injection-molded around them or are injection-molded into the walls of the box body. This offers the advantage that the position of the feed lines will be unambiguously defined and damage to the feed lines will be excluded during operation and assembly alike since the feed lines are surrounded by plastic.

Preferably, an electric connection element is arranged between the box body and the box cover. Thereby, the feed lines comprising the electric connectors for the electric motor can be electrically connected to the lines arranged in the box cover. The lines arranged in the box cover which preferably have the cover molded around them are connected to a contact plug. Power supply to the electric motor is performed via this plug. Further, signals can be transmitted via this plug. The arrangement of the contact plugs within the box cover has the advantage that different covers can be made available e.g. for different automobile manufacturers. Thus, by providing a dedicated cover for each manufacturer, the actuator can be customized. Such a modular design allows for a considerable cost reduction.

According to a particularly preferred embodiment, the box cover is further formed with a receiving chamber in which a sensor, e.g. a rotational-angle sensor, can be arranged. Preferably, also the electric lines connected to the sensor have the box cover injection-molded around them. Particularly, these lines can be guided to the contact plug so that the corresponding sensor signal can also be transmitted via the contact plug.

Preferably, the box body comprises a receiving portion, preferably of a cylindrical shape, for accommodating the electric motor. The receiving portion and the box body are preferably formed as one integral piece.

Particularly, the invention relates to an electric motor configured as a universal actuator and arranged in the gearbox according to the invention. Preferably, also a sensor device is arranged internally of the gearbox. A further essential aspect of the invention resides in the modular layout of the system. Particularly, the sensor device is arranged in the box cover so that the box cover can be easily exchanged depending on the type of the desired sensor device. Further, preferably, the contact plug for connection to a feed line or cable tree is arranged within the box cover. These contact plugs are formed in a customized design. For each required contact plug, there can thus be used a suitable box cover.

A preferred embodiment of the invention will be described in greater detail hereunder with reference to the accompanying drawings.

DETAILED DESCRIPTION OF A PREFERRED EMBODIMENT

Figure 1:
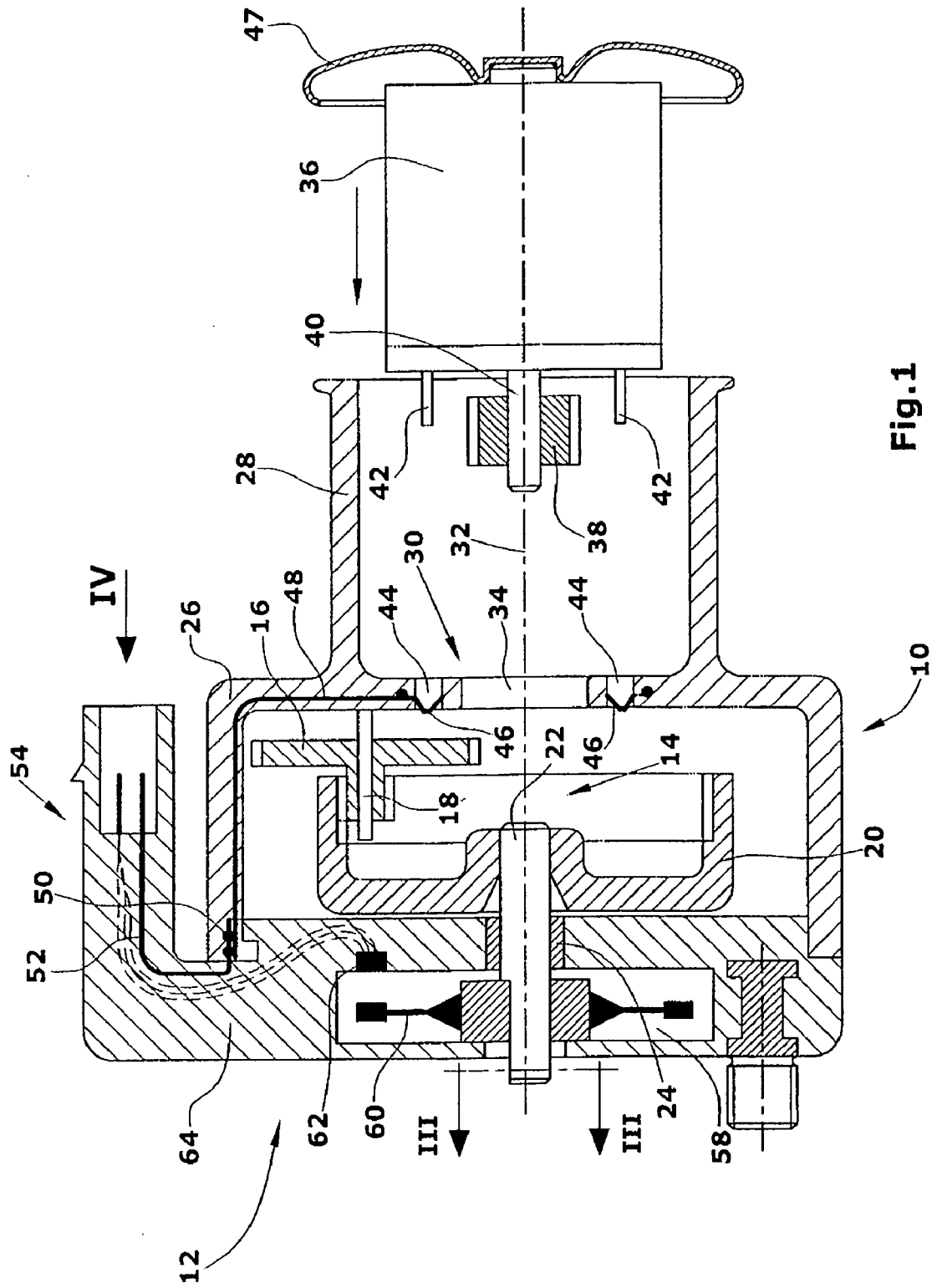
FIG. 1 is a schematic longitudinal sectional view of a gearbox having a gear and a rotational-angle sensor arranged therein.

The actuator according to the invention comprises a box body 10 closed by a box cover 12. In the illustrated embodiment, a gear 14 formed as a planetary gear is arranged within box body 10. In the Figures, there is shown a stepped planetary gear 16 which is supported on a shaft 18 fastened to the inner side of box body 10. Connected to the stepped planetary gear 16 is a hollow wheel 20. Hollow wheel 20 is connected to an output shaft 22 for common rotation therewith, output shaft 22 being supported within box cover 12 through an output shaft bearing 24.

Figure 2:
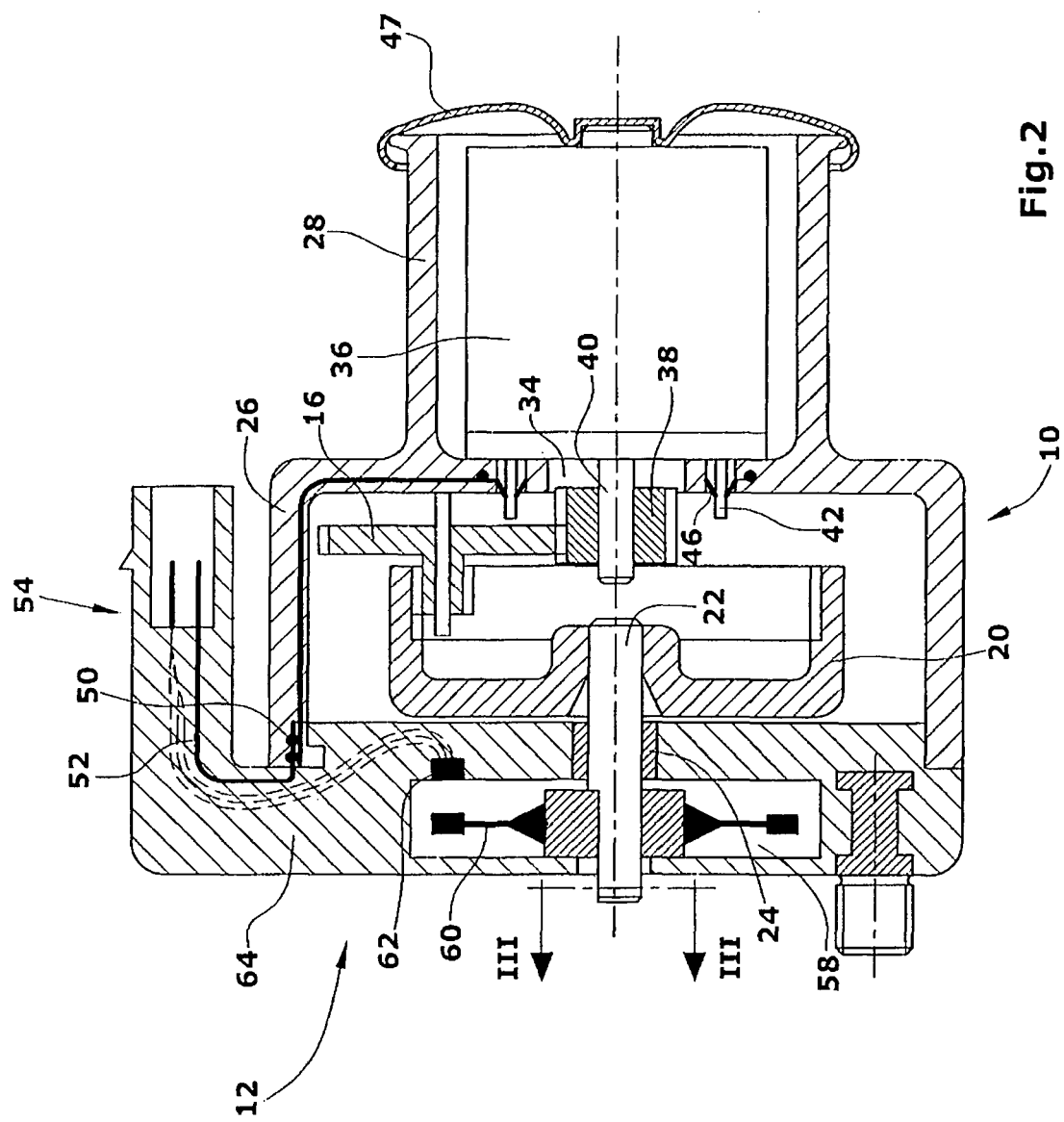
FIG. 2 is a longitudinal sectional view corresponding to the schematic longitudinal sectional view of FIG. 1, showing additionally the electric motor as mounted.

The cup-shaped portion 26 of box body 10, arrange to surround gear 14, has a substantially cylindrical box projection 28 concentrically connected thereto. According to the invention, the whole box body 10 is formed as in injection-molded plastic part. A partition wall 30 between the cylindrical box projection 28 and the cup-shaped portion 26 of box body 10 is formed with an opening 34 concentric with a central axis 32 of box body 10. In the mounted state of an electric motor 36, the drive shaft 40 of motor 36, connected to a drive gear wheel 38, is guided through this opening 34 to thus allow the gear wheel 38 to engage the stepped planetary gear 16 (FIG. 2). In this arrangement, opening 34 can include a bearing for drive shaft 40. When mounting the electric motor 36, two mutually adjacent contact pins 42 will be automatically inserted into openings 44 of partition wall 30. Arranged in the openings 44 are electric connectors formed as elastic contact elements 46. This offers the advantage that the electric contact for the electric motor 36 will be automatically established when mounting the motor. In the mounted condition, box projection 28 is closed by a lid 47 which is also provided to hold the motor 36.

Figure 4:
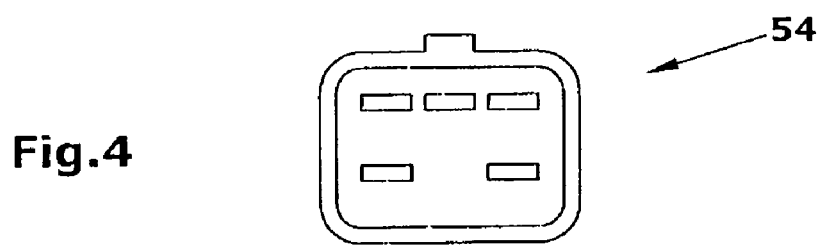
FIGS. 4, 5 and 6 are schematic plan views of various plug contacts taken in the direction of the arrow VI in FIG. 1.
Figure 5:
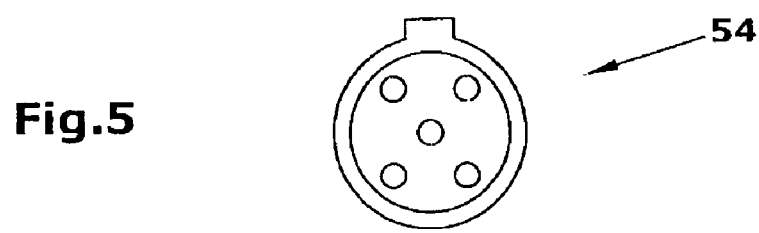
Figure 6:
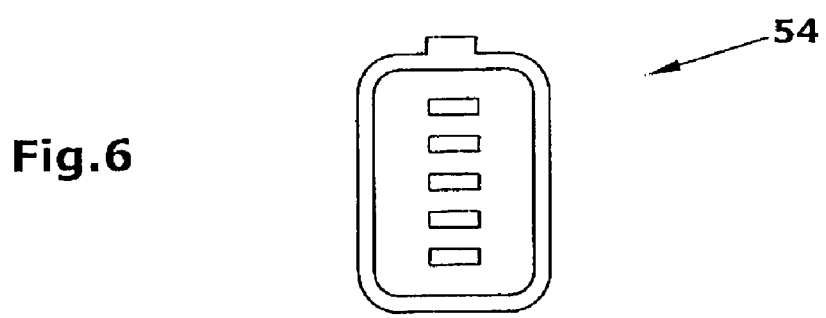

The electric connectors or contact elements 46 are connected to electric feed lines 48 arranged within the walls of box body 10 or molded into the walls. In the illustrated embodiment, the feed lines 48 extend to a first contact member of an electric connection element 50 on box body 10, while the other contact member of connection element 50 is provided on box cover 12. Internally of box cover 12, starting from connection element 50, electric lines 52 are provided with the box cover molded around them, leading to a contact plug 54. Contact plug 54 can be any one among a variety of contact plugs as illustrated by way of example in FIGS. 4, 5 and 6, and can vary according to the respective manufacturer.

Figure 3:
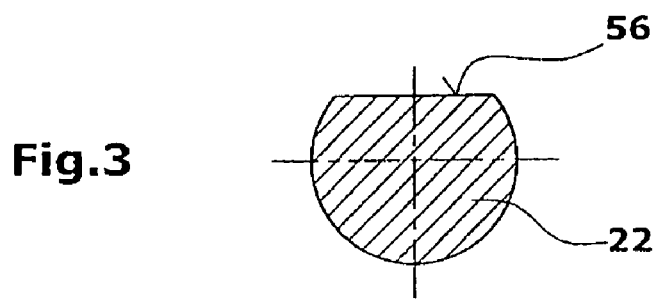
FIG. 3 is a schematic longitudinal sectional view taken in the direction of the line III-III in FIG. 1.

The output shaft 22 connected to hollow wheel 20 has its output end formed with a flattened portion 56 (FIG. 3), allowing the output shaft 22 to be connected e.g. to a lever for a throttle flap. The output shaft 22 can also be connected to an eccentric, e.g. for actuating a valve, for common rotation therewith.

Further, a receiving cavity 58 is provided in the box cover. Arranged in the receiving cavity 58 is a disk-shaped element 60 of a rotational-angle sensor 60,62 likewise connected to output shaft 22 for common rotation therewith. Further still, a receiving element 62 of the rotational-angle sensor is provided in or molded into box cover 12. Receiving element 62 has one or a plurality of electric lines 64 extending therethrough which are also molded into cover 12 and lead to the contact plug 54.

The invention claimed is:

1. An actuator for motor vehicles, comprising:
   a gear and a gear box for the gear,
   an electric motor being coupled to the gear,
   a gear box cover including a holding portion for an output shaft bearing for an output shaft of the gear,
   a gear box body closed by the gear box cover, and
   electric connectors provided at the gear box body for electric connection of the electric motor,
   wherein electric feed lines connected to the electric connectors are arranged within walls of the gear box body;
   wherein an electric connection element is arranged between the gear box body and the gear box cover, and
   wherein the gear box cover has a contact plug provided therein which is connected to the connection element via second electric lines.

2. The actuator according to claim 1 wherein the feed lines have the walls of the gear box body molded there around.

3. The actuator according to claim 1 wherein the electric connectors comprise elastic contact elements.

4. The actuator according to claim 1, wherein a receiving cavity is provided in the gear box cover for receiving a rotational-angle sensor.

5. The actuator according to claim 4, wherein third electric lines are provided in the gear box cover for connection of the contact plug to the rotational-angle sensor.

6. The actuator according to claim 1 wherein a box projection is formed on the gear box body for receiving the electric motor.

* * * * *